United States Patent Office 2,840,112
Patented June 24, 1958

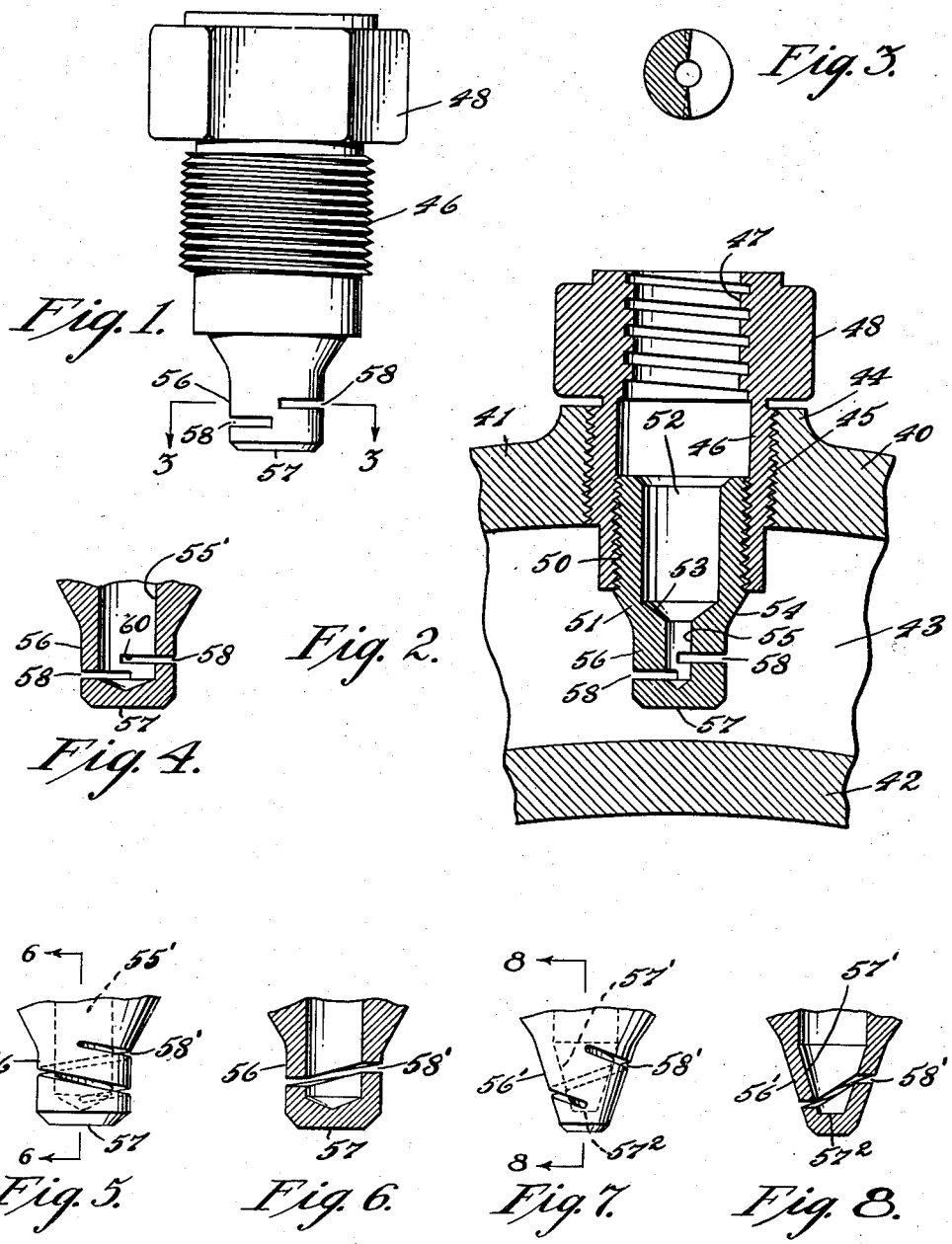

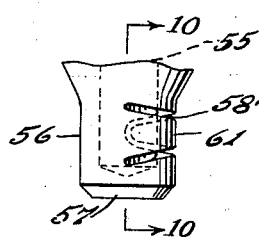
Fig. 9.
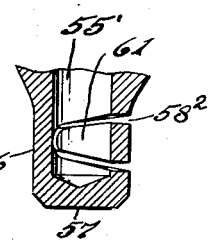
Fig. 10.
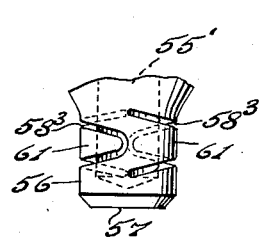
Fig. 11.
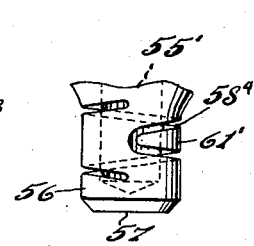
Fig. 12.
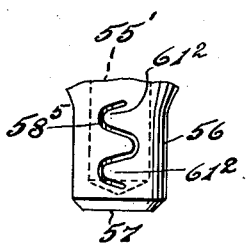
Fig. 13.
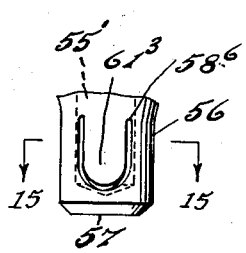
Fig. 14.
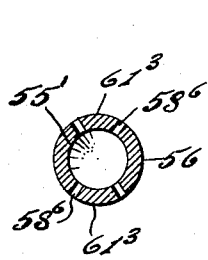
Fig. 15.
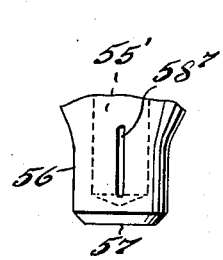
Fig. 16.
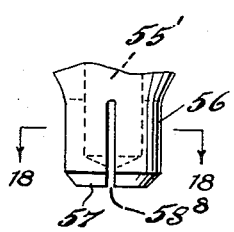
Fig. 17.
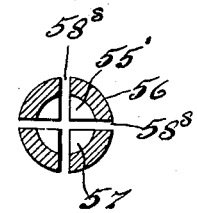
Fig. 18.
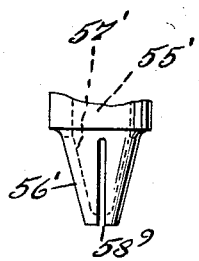
Fig. 19.
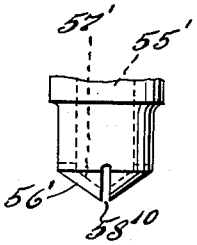
Fig. 20.
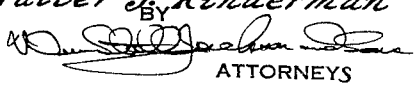

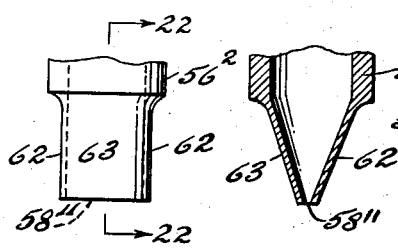
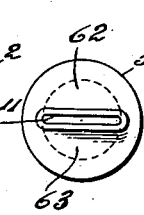
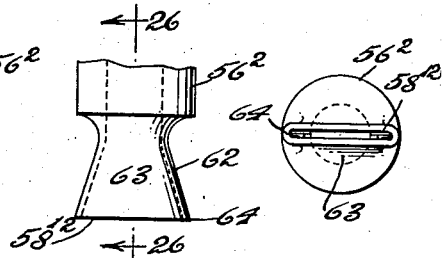
Fig. 21. Fig. 22. Fig. 23. Fig. 24. Fig. 25.
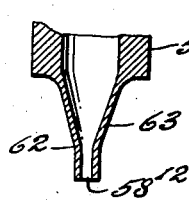
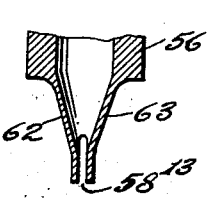
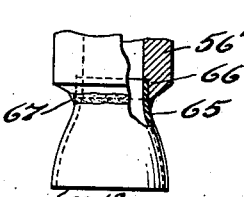
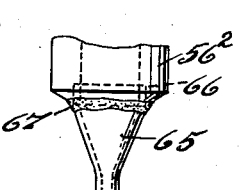
Fig. 26. Fig. 27. Fig. 28. Fig. 29.
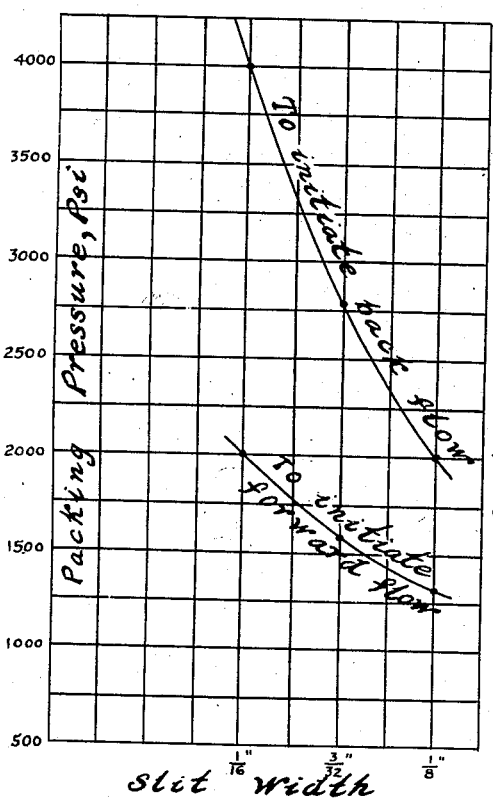
Fig. 30.
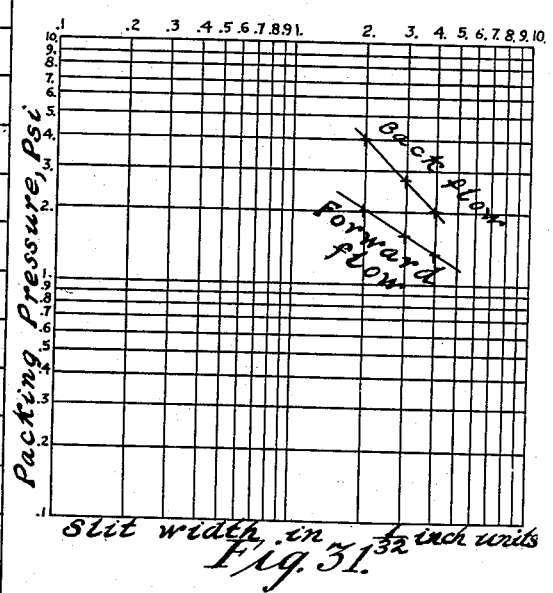
Fig. 31.

2,840,112

CHECK RETURN FITTING

David Robert Yarnall and Walter J. Kinderman, Philadelphia, Pa., assignors to Yarnall-Waring Company, Philadelphia, Pa., a corporation of Pennsylvania Application November 4, 1954, Serial No. 466,714

9 Claims. (Cl. 138—43)

The present invention relates to the introduction of fibrous plastic packing into stuffing boxes and other packing spaces and particularly to check return fittings which will permit introduction of packing under pumping pressure and prevent packing flow.

A purpose of the invention is to construct an interior passage and adjoining slit with diverging exterior surfaces so that the pumping pressure required to force fibrous plastic packing through the slit will be relatively low and the pressure required to force the packing back will be relatively high.

A further purpose is to make the slit between 0.030 and 0.125 inch wide and at least five times as long as its width so as to obtain most favorable conditions for introducing the packing combined with most favorable conditions to prevent back flow.

A further purpose is to elastically widen the slit by an appreciable amount such as 0.1 percent or more when the packing is inserted, and permit the slit to return to its normal width when the pressure is released, while permitting the slit to narrow by approximately the same amount.

A further purpose is to carry the packing through a passage extending axially of the tubular wall of the fitting and direct the slit at right angles to the axis.

A further purpose is alternately to direct the slit longitudinally with respect to the axis.

A further purpose is to extend the slit or a group of slits substantially around the circumference of the tubular wall of the fitting.

A further purpose is to make the slit helical around the tubular wall.

A further purpose is to converge the tubular wall as the packing advances and provide a helical slit in the conical wall.

A further purpose is to produce a serpentine slit in the fitting wall.

A further purpose is to provide a return bend in the slit and a flap or finger inside the return bend which displaces under packing flow into the packing space to widen the slit and under packing flow out of the packing space to narrow the slit.

A further purpose is to extend the slit through the side of the tubular fitting wall longitudinally of the axis.

A further purpose is to extend the slit across the end wall of the fitting and desirably also longitudinally of the side wall.

A further purpose is to provide a converging and elastically deformable end wall portion with the slit in the end wall and desirably along the side wall.

A further purpose is to expel the packing through the slit according to the following equation:

$$PW^{0.57} = K_1$$

and to provide back flow according to the following equation:

$$PW = K_2$$

where

P is the pressure initiating flow in p. s. i.
W is the width of the slit in inches
$K_1$ and $K_2$ are constants Further purposes appear in the specification and in the claims.

In the drawings we have chosen to illustrate a few only of the numerous embodiments in which our invention may appear, selecting the forms shown from the standpoints of convenience in illustration, satisfactory operation and clear demonstration of the principles involved.

Figures 1 to 3 illustrate the preferred embodiment.

Figure 1 is a side elevation of a check return fitting according to the invention.

Figure 2 is a fragmentary section through a stuffing box showing the check return fitting of the invention, the section being transverse to the stuffing box axis and through the axis of the fitting.

Figure 3 is a section of Figure 1 on the line 3—3.

Figure 4 is a modified fragment of Figure 2 showing a different contour of internal passage in the fitting.

Figures 5 and 6 illustrate a variation in which the slit is helical.

Figure 5 is a fragmentary side elevation of the modified check return fitting.

Figure 6 is a fragmentary section of Figure 5 on the line 6—6.

Figures 7 and 8 illustrate a modification in which the interior passage converges at the end and the slit is in a conical side wall.

Figure 7 is a fragmentary side elevation of the modified check return fitting.

Figure 8 is a fragmentary section on the line 8—8 of Figure 7.

Figures 9 and 10 show a modified check return fitting having a single serpentine slit.

Figure 9 is a fragmentary side elevation of the check return fitting.

Figure 10 is a fragmentary section on the line 10—10 of Figure 9.

Figure 11 is a view similar to Figure 9 showing flaps.

Figure 12 is a view similar to Figure 9 showing a variation having single serpentine slit extending all around the side wall of the fitting.

Figure 13 is a view similar to Figure 9 showing a serpentine slit concentrated at one portion of the side wall.

Figures 14 and 15 illustrate slits which provide flaps.

Figure 14 is a fragmentary view similar to Figure 9 showing the flap.

Figure 15 is a section on the line 15—15 of Figure 14.

Figure 16 is a fragmentary view similar to Figure 9 showing a longitudinal slit in the side wall.

Figures 17 and 18 show modifications having slits in the side wall and the end wall.

Figure 17 is a fragmentary view similar to Figure 9.

Figure 18 is a section on the line 18—18 of Figure 17.

Figures 19 and 20 are fragmentary side elevations showing different modifications having a converging interior passage and a slit in the side and end.

Figures 21, 22 and 23 illustrate a variation in which the slit is in the end of the converging wall.

Figure 21 is a fragmentary side elevation of the check return fitting.

Figure 22 is a fragmentary section on the line 22—22 of Figure 21.

Figure 23 is an end elevation of Figure 21.

Figures 24, 25 and 26 show a check return fitting having an end slit which gets longer and narrower as it approaches the end.

Figure 24 is a fragmentary side elevation of the check return fitting.

Figure 25 is an end elevation of Figure 24.

Figure 26 is a fragmentary section on the line 26—26 of Figure 24.

Figure 27 is a view similar to Figure 26 showing a slit extending also through the side wall of the fitting.

Figures 28 and 29 illustrate a composite construction of the slit.

Figure 28 is a fragmentary side elevation, partly in axial section, of a modified form of check return fitting of the invention.

Figure 29 is a fragmentary side elevation of a further modified form of check return fitting of the invention.

Figures 30 and 31 are curves useful in explaining the invention.

Describing in illustration but not in limitation and referring to the drawings:

Considerable difficulty has been encountered in the past in inserting fibrous plastic packing into packing spaces such as stuffing boxes due to the tendency of the packing to build up very high pressures at the inlet, especially after prolonged exposure of the stuffing box to elevated temperatures incident for example to a steam pipe line. In some instances there has been difficulty in inserting supplemental packing, whereas if the inlet has been adequate to facilitate insertion, there has been a tendency to squeeze out packing previously inserted.

The present invention is designed to provide adequate blockage against escape of packing from the packing space when for example a packing gun is opened to insert a new charge, while at the same time providing flow conditions which are favorable for the insertion of new packing.

As well known in the art, and illustrated for example in J. F. McKee U. S. Patent 1,989,644, packing boxes have been designed using fibrous plastic packing on expansion joints and the like which can be repacked while pressure is maintained on the steam line by using pumps or the like for forcing entrance of the new packing. At the connection between the pump and the packing space, orifices have been designed to retain packing in the packing space against flowing out through the orifice.

Difficulties have in some cases been encountered in the past due to unfavorable flow conditions in inserting packing through such orifices and insufficient retardation against packing back flow.

We have determined that these difficulties can be overcome by providing a nozzle into the packing space which is a slit of controlled width, and which at the side entering the packing space diverges at approximately a right angle. When using a nozzle width between 0.030 and 0.125 inch it has been found that the resistance against back flow can be greatly increased without at the same time making the resistance against flow into the packing space prohibitively high. Under these conditions the back flow pressure is much higher than the inflow pressure.

The invention is applicable to fibrous plastic packings particularly of the character in which asbestos fiber is provided along with solid and liquid lubricant.

Asbestos fiber (preferably process No. 5) 20 to 40 percent by weight.
Talc (preferably French or Italian talc through 60 and preferably through 100 mesh per linear inch or finer, best technical grade) 10 to 20 percent by weight.
Graphite (preferably flake graphite, and most desirably fine flakes of the character of Dixon No. 1122) 30 to 50 percent by weight.
Lubricating oil (preferably high temperature lubricating such as 700 viscosity (Socony Vacuum Super) Cylinder Hecla mineral oil is a desirable grade) 10 to 20 percent by weight.

Although this is a typical packing composition, any one of a variety of similar packings having comparable properties may be used. The preferred composition using the ingredients above is asbestos fiber 28.6 percent by weight, finely divided talc 14.3 percent by weight, finely divided graphite 42.9 percent by weight and mineral lubricating oil 14.3 percent by weight.

The check return fittings of the present invention take advantage of the packing properties to form a check return which will favor retention of packing in the packing box after it has been forced into the box through the fitting by any prior art gun.

The form of Figures 1 to 3 illustrates the preferred embodiment. Here a stuffing box 40 of any suitable mechanism, which may conveniently be an expansion joint of a steam line or the like, suitably consists of an outer housing 41, and an inner slide 42 which is movable axially with respect to the housing. A packing space 43 is provided between these members closed at the outside and on both ends by the housing 41 and on the inside by the slide 42. The packing space suitably is annular extended around the inner member as well known.

The housing has one or more bosses 44 which are threaded at 45 to receive a metallic inlet fitting 46 which is suitably threaded internally at 47 at the outer end to receive a cooperatively threaded pump plunger (not shown) to force packing into the packing space. The fitting is desirably formed as a nut at 48 around the outside to assist in screwing into the housing.

In accordance with the present invention, the fitting includes either integrally or, as shown in Figure 2, threaded at 50, an orifice inlet portion or thimble 51, the inner end of which extends into the packing space. The threading at 50 has the advantage of permitting adjustment of the height of the orifice portion with respect to the packing space. Where adjustment is not desired, it will of course be understood that the parts may be formed as one piece or be permanently joined as by welding.

The interior of the orifice portion 51 has a bore 52 extending axially in the fitting and desirably radially of the stuffing box which suitably converges toward the forward end at 53 where the fitting exterior converges at 54. Beyond the converging portion 53 the fitting has a reduced interior passage 55 which extends through a tubular portion 56 of the fitting to a closed end wall 57.

The interior passage 55 has extending in a direction transverse to the axis slits 58, of which two opposite ones are shown, each extending approximately half-way around the circumference and somewhat displaced axially. At the outside the slits encounter the tubular wall so that the opening diverges abruptly in right angles at both sides of each slit.

This form has the advantage that the packing undergoes a 90° angular change in direction as it enters the slits to flow radially outwardly through the slits, and then it diverges at the outer ends of the slits. This condition is very favorable in blocking reverse flow since in reverse flow this acts as a converging orifice in conjunction with a 90° change in direction, tending to block flow out of the stuffing box.

It will also be noted that the pressure applied to the packing to force it axially in passage 55 acts on the end wall 57 to elastically expand the fitting lengthwise, and the slits are caused to expand or open substantially, suitably at least 0.1 percent or more, while on the other hand back flow pressure before it can cause flow tends to contract the slits by a similar amount by acting on the end wall 57.

While this elastic change in dimension may be relatively slight dimensionally, fibrous plastic packing of the character under discussion is very sensitive to dimensional changes of the small diameter (the width of the slit) and the pressure required for back flow will increase tremendously when the slit narrows relatively slightly.

The structure of Figures 1 to 3 and the other forms function satisfactorily with slit widths of from 0.030 to 0.125 inch and preferably from 0.050 to 0.062 inch and slit lengths of at least five times the width.

Figure 4 shows an enlarged interior passage 55' in the tubular portion 56. The preferred slit width may in this case be slightly reduced within the range specified.

The slits in this case overlap circumferentially at 60, giving greater elastic variation in slit width between the condition of flow into the packing space and the condition of preventing back flow.

In some cases it is preferable to use helical slit 58' which extends more than a complete turn around the tubular wall 56 as shown in Figures 5 and 6. In this actual form the slit extends for one and one-half turns, but of course the helix can be lengthened or shortened as desired. This form gives high axial elasticity to widen the slit when the packing is forced into the packing space and close the slit against back flow.

In some cases it is desirable to provide a converging or conical tubular wall 56' near the forward end of the fitting, with a converging interior passage portion 57' and a flat interior end portion 57². This form provides a helical slit 58' in the conical wall. This serves to reduce the deflection of the slit by reason of the smaller pressure area acting on the end portion and the lowered spring properties of the conical wall due to reduction of the mass of material. This form is desirable for high temperature applications where loss of oil in the packing at elevated temperature may require a very high initial pressure to start packing flow. Under such conditions, this form of packing is less likely to undergo a permanent deformation or other damage.

The form of Figures 9 and 10 illustrates a flap 61 formed by a serpentine slit 58² in the tubular metal side wall which has a reverse bend. Internal pressure in inserting the packing tends to push the flap 61 out and increase the slit opening while back flow tends to close the flap, reduce the slit opening and effectively preventing back flow.

Figure 11 shows a form with two serpentine slits 58³, one on each side of the tubular wall 56, and each forming a flap 61 by the reverse bend. Each flap extends approximately half way around the cylindrical fitting wall.

Figure 12 shows a form in which a single flap 61' extends entirely around the tubular wall due to lengthening of the amplitude of the serpentine slit 58⁴.

In some cases there may be multiple flaps 61² formed by two or more reverse bends on a single serpentine slit 58⁵ in the side wall of the fitting as shown in Figure 13.

The flap may extend longitudinally rather than circumferentially as indicated at 61³ in Figures 14 and 15. In this form there is a U-shaped slit 58⁶ on each side of the fitting.

Great varieties of forms of reverse bends or serpentine slits are available.

Figure 16 illustrates a metallic check return fitting having an elastically deformable wall provided with one or more longitudinal slits 58⁷ which deform as above described. In some cases it is desirable to provide slits in the end wall, suitably in line with side slits. The form of Figures 17 and 18 provide two slits 58⁸ at right angle positions each of which extends across the end and up the side wall and conforms to the dimensions above described, the slits desirably being at right angles. This construction, if desired, may be accomplished by serpentine forming of a single slit.

In some cases it may be advantageous to use a conical side and end wall 56' of gradual slope as in Figure 19 or steep slope as in Figure 20 and extend the slit through the end and also through the side, as shown at 58⁹ and 58¹⁰. These slits also are elastically deformed as in the other cases described and meet the dimensional requirements.

Where an extremely flexible form is desired, the construction of Figures 21 to 23 is desirable. There is here a tubular side wall 56² which at the forward end is reduced in wall thickness at 62 and flattened on opposed sides 63 to form an end slit 58¹¹ which conforms with the dimensional requirements. This flexible portion 62 readily responds to widen the slit when the packing is forced in and to constrict the slit against back flow.

Where this construction is made from a tubular portion by flattening, the end wall 62 is widened at 64 to make a longer slit 58¹² as shown in Figures 24, 25 and 26. In some cases it is preferable as shown in Figure 27 to run the slit also up the side wall as indicated at 58¹³ in Figure 27. This gives greater flexibility to widen the slit when packing is inserted and to contract it against back flow.

The form of Figures 24 and 26 can more conveniently be constructed by introducing a separate metallic insert 65 to form the slit, and seating the insert in an annular recess 66 of the tubular wall 56², brazing or welding at 67.

In all of the above forms, the dimensional limits as above set forth are employed.

The forms of the present invention which undergo considerable elastic deformation function as springs and should therefore be made of high strength steel or other alloy capable of exhibiting spring properties at the particular temperature. In some cases these results may be accomplished by heat treated alloy steels which will maintain their properties at the operating temperature, and under higher temperature conditions, higher alloys may be used.

It will be evident of course that the principles of the invention are applicable with supplemental checks or retraints in the passage.

Tests have been conducted using various orifice forms in accordance with the invention and it has been discovered that the check return of the invention functions according to a well established law. In the tests the packing pressure required to initiate packing flow through the check return fitting into the stuffing box was measured and also the stuffing box pressure required to initiate return flow was measured. In the results shown, an inner passage at a diameter of 3/16 inch and various nozzle forms as indicated in the invention were employed.

Using slits normal to the axis of the check return fitting, the values set forth in the following table were determined:

| Slit width | Pressure in p. s. i. to introduce packing into stuffing box | Pressure in p. s. i. to initiate back flow |
|---|---|---|
| 1/16 inch | 2,000 | 4,000 |
| 3/32 inch | 1,600 | 2,800 |
| 1/8 inch | 1,350 | 2,000 |

It is significant to point out that the pressures to initiate flow from the fitting to the packing space are well defined within narrow pressure limits. Below the pressure required to initiate flow, the packing behaves much like a solid. At pressures above those required to initiate flow, the packing behaves like a viscous liquid. It is believed that these characteristics are attributable to a considerable extent to the asbestos fibers which bridge over clearances and interlace the packing mass. It is necessary to shear this mass in order to initiate flow. Loads in excess of the shearing force required produce flow.

Where the nozzle is converging, the pressure required to shear the fibers exceeds that required for a straight or diverging nozzle by reason of the preliminary compacting flow required in the restricted throat of the nozzle. The observed data indicate that as the slit width of the nozzle diminishes, the ratio of pressure required for back flow to pressure required for forward flow increases. This may be understood more clearly by reference to Figure 30 which plots the packing pressure to initiate flow in p. s. i, against the slit width in inches. The lower curve is for the initiation of forward flow and the upper curve is for the initiation of back flow.

Figure 31 plots these data logarithmically and the relations are found to approximate straight lines. Letting P be the pressure to initiate flow in p. s. i. and W the slit width in inches, the data for forward flow conform to the following equation:

$$PW^{0.57}=K_1$$

where $K_1$ is a constant.

The data for back flow conform to the equation $$PW=K_2$$

where $K_2$ is a different constant.

From these relations it is clear that orfice characteristics previously discussed contribute flow differences which change the exponent of W which, for the range considered, is a lower power for entering flow than for back flow. As the slit width increases with elastic deformation of the slit caused by the entering pressure, the required pressure P to initiate flow decreases and conversely as the slit width decreases by elastic deformation under back pressure the pressure F required to produce back flow increases.

It should be emphasized that this condition occurs without closing any valve in the sense of complete closure. This invention depends upon the special nozzle characteristics which favor flow of the packing as a fluid and favor relatively low pressure flow in one direction and make the packing function as a solid against back flow without at any time completely closing the orifice. The flow form of the passage cooperates with the physical flow characteristics of the packing to make easy packing injection possible as far as this can be done consistent with prevention of back flow without using moving parts.

The form employing a ⅟₁₆ inch wide slit requires an entering pressure of 2000 p. s. i. and it is necessary to have a back pressure of 4000 p. s. i. to cause back flow. Any increase in the slit width on entering will lower the pressure to cause the packing to enter and any decrease of slit width will increase the pressure required for back flow. For this reason elastic deformation of the slit is quite important.

It will of course be understood that the exact mathematical relations will vary with the various orifice forms and with the composition and temperature of the packing, but the relations in general remain as indicated.

It will be evident that the appropriate divergence at the outside of the nozzle and preferably also the directional change at the inside of the nozzle along with the orifice dimensions and the elastic deformation of the slit all contribute to the desirable result.

A slit having a width of ³⁄₃₂ inch which flexes to ⅛ inch width in opening and closes to an average width of ⅟₁₆ inch against back flow gives an advantageous relation between inflow pressure and back flow pressure of the order of 2 to 1, which is similar to that given by a ⅟₁₆ inch radial slit, as shown in Figures 30 and 31. Combinations of slit width and elastic deformation can be employed to give the particular ratio of inlet pressure to back pressure required for flow as desired.

In view of our invention and disclosure variations and modifications to meet individual whim or particular need will doubtless become evident to others skilled in the art, to obtain all or part of the benefits of our invention without copying the method and apparatus shown, and we, therefore, claim all such insofar as they fall within the reasonable spirit and scope of our claims.

Having thus described our invention what we claim as new and desire to secure by Letters Patent is:

1. A check return fitting for fibrous plastic packing to be introduced into a packing space, which fitting comprises a thimble having an elastic metal wall, a slit through said wall and a thimble cavity, said cavity accommodating a supply of the fibrous packing under pressure and said slit having a width of between 0.030 inch and 0.125 inch and a length of at least five times the width, a face of said thimble having an area large enough and so disposed with respect to said slit that force of the pressure of said fibrous packing material received by said area elastically deforms said metal thimble wall until said slit is widened at least 0.1 percent for the fibrous packing to pass plastically through said slit into the packing space, the width of said slit being diminished by said thimble elastically taking a less distended position when said thimble is relieved of pressure of the fibrous packing in said thimble cavity, said thimble thus resisting back flow of said plastic material from the packing space.

2. A check return fitting of claim 1, in which the slit is through only a side portion of the thimble wall and extends substantially parallel to the longitudinal axis of the thimble.

3. A check return fitting of claim 1, in which the slit is through only a side portion of the thimble wall and is in a plane substantially perpendicular to the longitudinal axis of the thimble.

4. A check return fitting of claim 1, in which the slit extends through only a bottom portion of the thimble wall.

5. A check return fitting of claim 1, in which the slit extends through bottom and side portions of the thimble wall.

6. A check return fitting of claim 1, in which the slit through the thimble wall has both transverse and longitudinal extent with respect to the longitudinal axis of the thimble.

7. A check return fitting of claim 1, in which the flow through the fitting conforms to the equation:

$$PW^{0.57}=K_1$$

and the back flow conforms to the equation:

$$PW=K_2$$

where

P is the pressure initiating flow in p. s. i.
W is the width of the slit in inches
$K_1$ and $K_2$ are constants.

8. A check return fitting of claim 1, in which the slit through the thimble wall has a return bend producing a flap wall portion.

9. A check return fitting of claim 1, in which the slit through the thimble wall is helical having at least about one turn around said wall.

References Cited in the file of this patent

UNITED STATES PATENTS

| | | |
|---|---|---|
| 813,075 | Boudin | Feb. 20, 1906 |
| 996,588 | Kennedy | June 27, 1911 |
| 1,308,613 | Anderson | July 1, 1919 |
| 1,335,267 | Ambrose et al. | Mar. 30, 1920 |
| 1,989,644 | McKee | Jan. 29, 1935 |
| 2,147,192 | Carson | Feb. 14, 1939 |
| 2,191,458 | Duden | Feb. 27, 1940 |
| 2,246,565 | Abercrombie | June 24, 1941 |
| 2,604,119 | Hughes | July 22, 1952 |
| 2,665,052 | Stanton | Jan. 5, 1954 |

FOREIGN PATENTS

| | | |
|---|---|---|
| 9,653 | Great Britain | May 17, 1894 |